(12) United States Patent
Braunstein

(10) Patent No.: US 7,783,078 B2
(45) Date of Patent: Aug. 24, 2010

(54) TUNABLE OBJECT DETECTION

(75) Inventor: Zachary Braunstein, San Marcos, CA (US)

(73) Assignee: Fujitsu Transaction Solutions Inc., Frisco, TX (US)

( * ) Notice: Subject to any disclaimer, the term of this patent is extended or adjusted under 35 U.S.C. 154(b) by 918 days.

(21) Appl. No.: 11/611,937

(22) Filed: Dec. 18, 2006

(65) Prior Publication Data
US 2008/0147244 A1 Jun. 19, 2008

(51) Int. Cl.
*G06K 9/00* (2006.01)
(52) U.S. Cl. ................................. 382/103
(58) Field of Classification Search ........... 382/100, 382/103; 356/603, 621, 629, 638; 705/23
See application file for complete search history.

(56) References Cited

U.S. PATENT DOCUMENTS 5,559,664 A * 9/1996 Dogul et al. ............... 361/191
6,829,371 B1 * 12/2004 Nichani et al. ............. 382/103
2002/0017604 A1 2/2002 Nakazaki et al. ........... 250/221
2005/0017157 A1 1/2005 Emmanuel ................. 250/221

* cited by examiner

*Primary Examiner*—Andrew W Johns
(74) *Attorney, Agent, or Firm*—Holland & Knight LLP

(57) ABSTRACT

A computer-implemented method includes defining a valid scan or range of valid scans as a valid activity of an object in an application-specific activity taking place through a light curtain sensing area of a light curtain, defining an invalid scan or range of invalid scans as an invalid activity of the object in the application-specific activity taking place through the light curtain sensing area of the light curtain, storing parameters and activity-specific rules for processing a plurality of objects, monitoring and processing the object in the application-specific activity taking place through a light curtain sensing area of a low cost light curtain in conjunction with the stored parameters and activity-specific rules, and reporting a status and results of the processing of the object.

20 Claims, 12 Drawing Sheets

TUNABLE OBJECT DETECTION

BACKGROUND

The present invention relates to data processing by digital computer, and more particularly to tunable object detection.

An optical curtain generating device typically includes a light emitting pillar assembly accommodating an array of light emitting units within a pillar case and a light receiving pillar assembly accommodating an array of light receiving units within a pillar case, the light emitting pillar assembly and light receiving pillar assembly being placed opposite each other so as to form a light curtain for detecting an object between the pillar assemblies.

The arrays of light receiving and emitting units accommodated in the pillar cases are typically formed by combining a number of multi-beam optical modules each having a unit number of light beams, such as, for example, four, eight and sixteen light beams. Each multi-beam optical module includes a number of optical elements, such as a light emitting element and a light receiving element in the example of a light receiving unit, corresponding to a unit number of light beams that could be focused by addition of optical lenses, which are integrally incorporated in front of emitting and receiving units that fixes a pitch of the light beams.

There are a number of applications in which a moving object is detected using a light curtain. Among these applications, there are applications that are aimed to prevent unauthorized activities, such as detection of an object that is not expected. The intensity and/or accuracy of detection can vary.

There are number of applications that do not require high intensity or high accuracy of object detection that high cost security systems offer, but rather require an object detection system that serves as a deterrent system or device aimed at improving business performance, e.g., an object detection system installed for automatic check out lines in supermarkets and other stores with an objective to detect other objects, if any, in addition to the objects that are expected, i.e., purchased objects. Due to a variety of object sizes and their dollar value, there is no need for a business to use a high cost security type object detection system. Instead, a low cost object detection system can be used as a deterrent device to assist business management of a store in reducing loss of revenues in a form of valuables for which they were not paid. The deterrent type object detection system can be classified by its ability to detect illegal or invalid activities, such as, for example, the presence of objects not expected or the presence of more objects than expected. The performance of these types of systems can be characterized by parameter detection intensity.

SUMMARY

The present invention provides methods and apparatus, including computer program products, for tunable object detection.

In general, in one aspect, the invention features a method including defining a valid scan or range of valid scans as a valid activity of an object in an application-specific activity taking place through a light curtain sensing area of a light curtain, defining an invalid scan or range of invalid scans as an invalid activity of the object in the application-specific activity taking place through the light curtain sensing area of the light curtain, storing parameters and activity-specific rules for processing a plurality of objects, monitoring and processing the object in the application-specific activity taking place through a light curtain sensing area of a low cost light curtain in conjunction with the stored parameters and activity-specific rules, and reporting a status and results of the processing of the object.

In embodiments, the method can include executing application-specific control actions to warn a host computer system of a detected violation or violations.

Reporting can include audible indicators and/or visual indicators.

Monitoring and processing can include receiving real-time modifications to the stored parameters and activity-specific rules from a remote computer system over a communications link. The real-time modifications to the stored parameters can tune object detection intensity, violation detection intensity, and/or status reporting intensity related to real-time object detection.

The stored parameters and activity-specific rules can be adjustable when respective objects appear within the light curtain sensing area, and/or can be adjustable in response to environmental changes detected by the remote computer system.

In another aspect, the invention features a method including recording actual object scan data of objects in an object library, editing the recorded object scan data, storing the recorded object scan data in a controller of a light curtain, simulating an object moving through a light curtain sensing area of the light curtain to generate and store parameters and activity-specific rules for processing a specific object, monitoring and processing the specific object in an application-specific activity taking place through a light curtain sensing area of a low cost light curtain in conjunction with the stored parameters and activity-specific rules, and reporting a status and results of the processing of the specific object.

In embodiments, the method can include executing application-specific control actions to warn a host computer system of a detected violation or violations.

Reporting can include audible indicators and/or visual indicators.

Monitoring and processing can include receiving real-time modifications to the stored parameters and activity-specific rules from a remote computer system over a communications link. The real-time modifications to the stored parameters can tune object detection intensity, violation detection intensity, and/or status reporting intensity related to real-time object detection.

The stored parameters and activity-specific rules can be adjustable when respective objects appear within the light curtain sensing area, and/or can be adjustable in response to environmental changes detected by the remote computer system.

The invention can be implemented to realize one or more of the following advantages.

A tunable object detection method can be utilized in a variety of object detection applications.

The tunable object detection method enables businesses to effectively implement an object detection system using a low-cost light curtain, while retaining important features, such as real-time "tuning," which are often found in expensive implementations.

The tunable object detection method is part of a light curtain system and can reside, for example, in a controller and/or personal computer (PC).

One implementation of the invention provides all of the above advantages.

Other features and advantages of the invention are apparent from the following description, and from the claims.

BRIEF DESCRIPTION OF THE DRAWINGS

Like reference numbers and designations in the various drawings indicate like elements.

DETAILED DESCRIPTION

Figure 1:
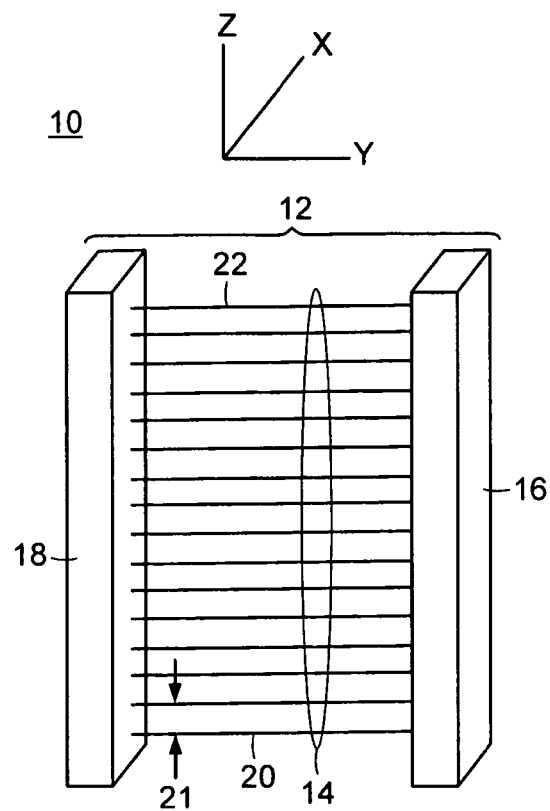
FIGS. 1-2 show an exemplary light curtain arrangement.

As shown in FIG. 1, an object detection system 10 can be used for variety of applications. One exemplary application includes automatic check-out lines at grocery stores. The system 10 includes an exemplary light curtain 12 with parallel streams of rays 14. In other examples, the streams of rays 14 can be interlaced. In general, stream refers to a directional emission of electro-magnetic waves, visible or not visible to human eye, by one or more discrete emitting components of the emitter device of the light curtain 12, which when not blocked by an object, can be detected by the respective discrete sensing components of the sensor device of the light curtain 12. Parameters of the stream, such as frequency, duration or intensity, focus or density, can be selected to ensure reliable and safe operation of the light curtain 12 for a given application or environment. Each emitted stream can be focused toward the respective sensor component by using optical focusing lenses.

Control of the parallel streams 14 can include checking each discrete sensor component 16 status when a respective discrete emitter component 18 is turned on.

The streams 14 include a first stream 20 and a top (or last) stream 22. Z1 represents a vertical resolution as a distance between adjacent streams emitted by emitter device 18.

Figure 2:
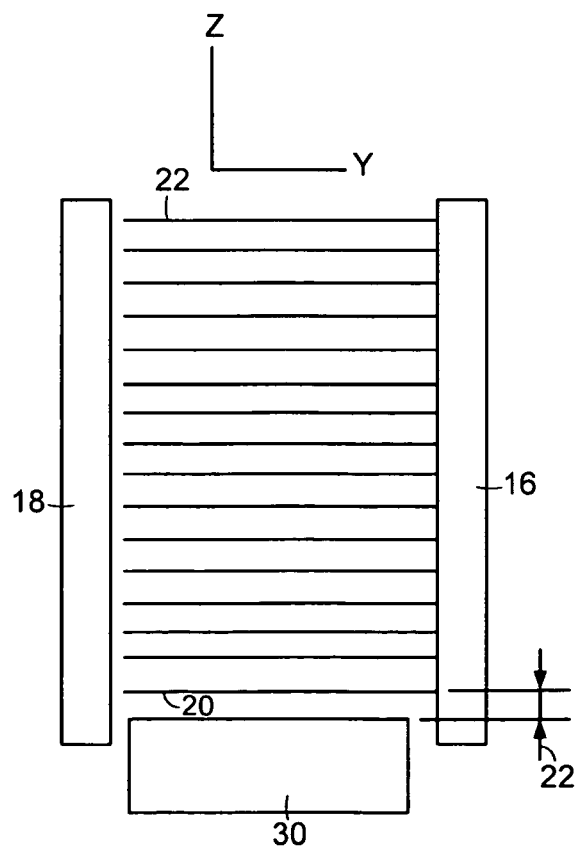

As shown in FIG. 2, a conveyor system 30 can be combined with the light curtain 12. The conveyor system 30 is used for transporting items or objects through a light curtain sensing area. In one example, the conveyor 30 is an electro-mechanical device, which moves objects through the sensing area of the light curtain. The conveyor system 30 can have an object placed on top of a transporting component such as flat belt, or have objects suspended from the transporting component, such as with hooks. The configuration, i.e., the selection of the conveyor system 30 and the positioning of the light curtain 12 with respect to an object trajectory, depends on requirements for a specific application. For simplicity, a configuration with objects being transported on top of the conveyor 30 through a stationary light curtain placed across the belt is described. However, other implementations are possible.

A vertical clearance Z2 between the top of conveyor 30 and a stream of the light curtain 12 is used to align the light curtain 12 and the conveyor system 30 so that minimum profile objects can be detected by the light curtain 12. In general, an object is anything that is visible or tangible and is relatively stable in form.

Throughout this description various terms are used with reference to the object detection system 10. For example, activity generally refers to a condition when process 1000, described below, has detected that at least one of the sensor components is blocked. Activity duration generally refers to a time elapsed from the moment an activity is detected to moment it cleared the light curtain.

A blocked sensor generally refers to a status of a discrete sensor component of a digital light curtain, which occurs when the stream coming out of a respective discrete emitter component is interrupted by an object placed in-between.

A broken scan generally refers to scan data with gaps. A clear transition generally refers to a status of a light curtain when no object(s) or activity is present within the sensing area.

Clear confirmed generally refers to a status of a light curtain when a clear transition detected has been present for specified period of time.

Detection intensity is generally one of several performance criteria that can be defined as an average percentage level of actual results attained by process 1000 in terms of prompt detection and reporting of "expected/desirable" and "undesirable" conditions, or activities. Applications for "deterrent" type object detection systems may not require that every object (out of a possibly huge diversified inventory) must be 100% properly detected at all times. Instead, reasonable objectives are set.

Detectable objects generally refer to physical objects, which when placed or moved through the light curtain sensing area, are detected by the sensor.

Detection status generally refers to a real-time status of process 1000 based on collected object scan data, while an object or objects is/are still present within light curtain's sensing area. Detection status can be "valid activity is suspected," "valid activity is confirmed," "valid and invalid activities are suspected," "invalid activity is suspected" "invalid activity is confirmed."

An emitter generally refers to one of the devices of the light curtain, which can emit using discrete emitting components visible or not visible to the human eye a stream of electromagnetic waves, which can detected by the sensor components of the light curtain. Each emitted stream can be focused towards the respective sensor component by optical focusing lenses.

An expected activity is generally an activity defined by process 1000 as one expected through the light curtain sensing area. An expected activity can be application-specific.

An expected object can be an expected activity or one of several possible expected activities.

A gap for a given scan data is generally defined as one or more consecutively not blocked sensors in-between blocked sensors.

A gap number refers generally to objects, including problematic objects when going through the light curtain that produce scan data, which can have a gap or gaps. Gaps are generally numbered in sequence, starting with a #1 sensor located closest to a reference surface.

Gap size for a given gap number(s) is defined as a number of consecutively not blocked sensors. Process 1000 can apply gap size as one of the real-time calculated parameters to properly identify whether a detected activity is considered valid (acceptable) or invalid. A level of violation can be based on a number of gaps and their size.

Gap duration generally refers to a time from the point of detection of a specified gap number to a point of a gap absence. Process 1000 can apply gap duration as one of the real-time calculated parameters to properly identify whether a detected activity is considered valid (acceptable) or invalid.

Horizontal profile refers generally to one of the parameters of an object that is defined as the duration (minimum, average, maximum) along an X-axis it can produce when the respective object passes through the light curtain sensing area. Horizontal can also refer to an object's "X-profile."

Immunity generally refers to a characteristic of the light curtain related to its ability to operate properly within a specified environment. For a given environment, immunity can be achieved by proper selection of, for example, strobing frequencies for the emitter and sensor, addition of optical and/or electronic filtering components.

An invalid activity refers to a condition when process 1000 has detected an object or objects, or section(s) of an object or objects, which have not complied with the definition of a valid activity.

An invalid scan refers to individual scan data that does not comply with a definition of valid scan data.

An invalid detected status is a condition when the light curtain in a clear status has detected a presence of an invalid activity.

An invalid confirmed status generally refers to a condition when the light curtain remains in an invalid status for specified period of time.

Invalid transition detected status generally refers to an invalid activity after a valid confirmed status or valid transition confirmed status.

Invalid transition confirmed status refers generally to a condition in which the light curtain has remained in an invalid transition detected status for specified period of time.

Object data represents each object. In one example, object, and as a result respective data, can have a unique bar code label.

Object duration time refers generally to a time from the point of an object entering the light curtain's sensing area and to the point of time when the object exits the light curtain's sensing area.

Object visibility reflects an object's ability to block the streams generated by an emitter when the object is present in sensing area of a light curtain.

An opaque object is an object made out of material that will most always be detected by a given light curtain if placed within its sensing area.

A problematic object is an object that can present a problem from being properly detected. These types of objects can have sections that are "transparent" to the light curtain or not visible. Such objects can include, for example, plastic bags, plastic bottles or containers, glass bottles or containers, and so forth. There can be objects that are shaped and made out of very thin material, which could impact proper detection due to limitations of resolution of discrete digital light curtains.

Response time refers to a maximum time that the light curtain can require prior to submitting results of an activity that was defected in its sensing area.

Scan cycle refers generally to a time required for a light curtain system to control all emitter and sensor devices to establish if any discrete sensor component was either able to detect the respective stream coming out of emitter or was blocked by an object.

A solid scan refers generally to scan data with no gaps.

Stream Number generally refers to a sequential number of parallel streams in-between respective emitter and sensor devices from a starting reference point.

A transition or transition point in-between adjacent or consecutive scan data is defined as an event when the latest scan data are different from the previous scan data by either status of at least one discrete sensor component or by scan data that has a predefined classification, such as valid scan, invalid scan, clear scan, and so forth.

Transition connection refers to a rule used by process 1000. The rule generally states if for a valid confirmed activity the "OR" scan data based on scan data of just prior to transition and the first scan date of the transition itself produced a result that can be considered a valid activity, then detection status should be maintained as valid activity or one object detected, otherwise, invalid activity is detected. A valid transition connection rule states that if for an invalid confirmed activity the "OR" scan data based on scan date just prior to transition and the first scan data of the transition itself produced result, which can be considered as a valid activity, then detection status should change to valid activity detected.

Figure 3:
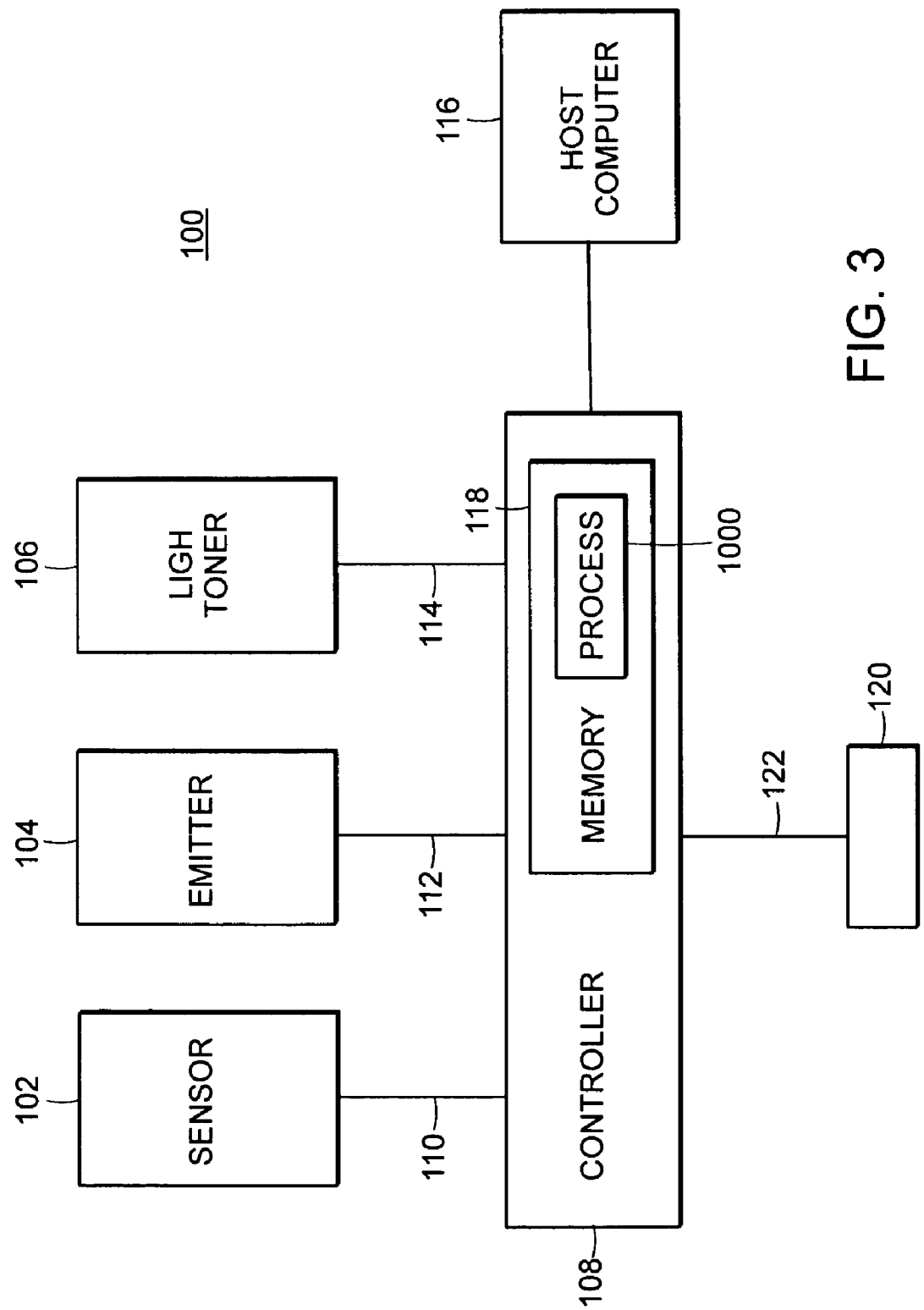
FIG. 3 is a block diagram for an exemplary object detection system.

As shown in FIG. 3, an exemplary object detection system 100 includes a sensor 102, an emitter 104 and an application status light tower 106, all linked to an embedded controller 108 by interfaces 110, 112 and 114, respectively. The application status light tower 106 can be used directly by the controller 108 and/or by a host computer system 116 to indicate application status in real-time, including object detection status and results available from the object detection system 100. The embedded controller 108, which can be responsible for operation of the light curtain and execution of an object detection process 1000 residing in a local controller memory 118.

The exemplary object detection system 100 also includes a conveyor system 120 linked to the embedded controller 108 by an interface 122. The interface 122 can be either a parallel or serial type of control/communication interface.

The application status light tower 106 can be used directly by embedded controller 108 and/or by the computer system 116 to indicate application status in real-time, including object detection status and results available from light curtain system 100. The status of light tower 106 can be signified by, for example, turning on a specific light or lights, turning on and off one or several lights, or some combination of lighting events.

A selection of a type and shape of test objects depends on the particular application and its objectives, including a detection intensity level required. Test objects are used to properly design and test a specific object detection system and/or proper system component alignment. For simplicity, instead of showing test objects moving on top of the conveyor system in a direction through a stationary light curtain, here we will consider the conveyor with objects considered to be stationary, while the light curtain moves along the conveyor in an opposite direction.

Figure 4:
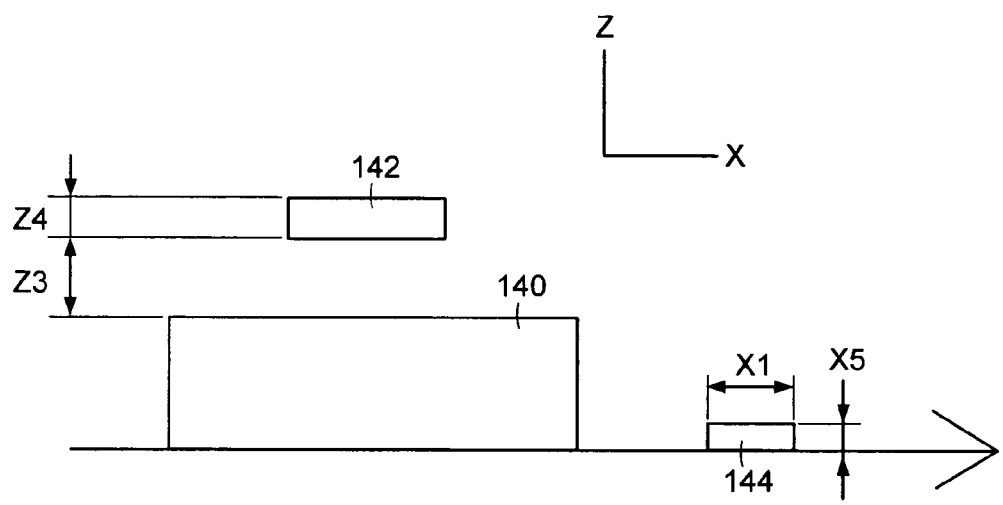
FIGS. 4-8 illustrate various exemplary test object scans.

Test objects placed on the top on the conveyor come in all shapes and sizes and thus present of transition changes for any object detection system. For example, as shown in FIG. 4, a conveyor includes three test objects of varying shapes and sizes, i.e., test object 140, test object 142 and test object 144. Test object 140 is a visible object of rectangular shape with a vertical profile above a limit set by Z5.

Test object 142 is a visible object of rectangular shape with a vertical profile above a limit set by Z4, which is thrown over the top of test object 140 generating a detectable Gap Z3. The x-size and the speed of test object 142 with respect to the light curtain are within respective limits defined by application specification requirements.

Test object 144 is a visible object of rectangular shape with a minimum vertical profile set by Z5 limit and minimum object duration set by X1 limit for a specified conveyor speed. Test object 144 can be used to verify proper alignment of the light curtain in relation to the conveyor surface upon which objects are expected to move through a light curtain sensing area.

Figure 5:
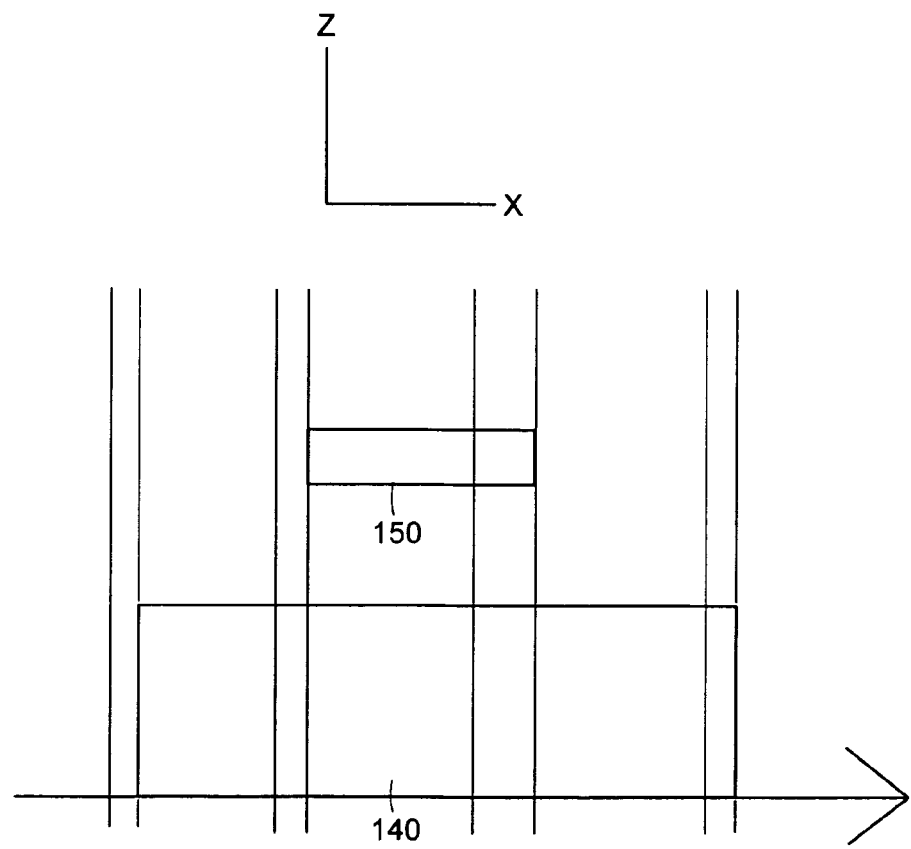

As shown on FIG. 5, a test object 150 is thrown over test object 140. For applications such as automatic check-out lines, if vertical separation between objects generates a detectable gap, then this could be considered an invalid activity, which, in addition to one object detection, should also be detected and reported.

Figure 6:
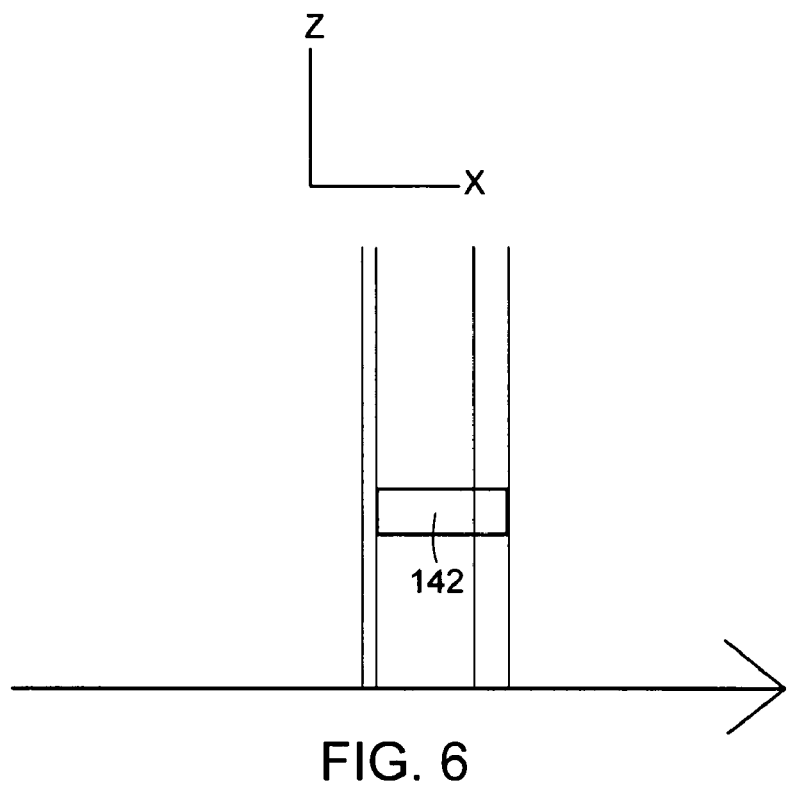

As shown in FIG. 6, test object 142 is thrown over the top of the conveyor. For applications such as automatic check-out lines, if vertical separation between this object and the top surface of the conveyor belt generates a detectable gap, then this could be considered an invalid activity that should be detected.

Figure 7:
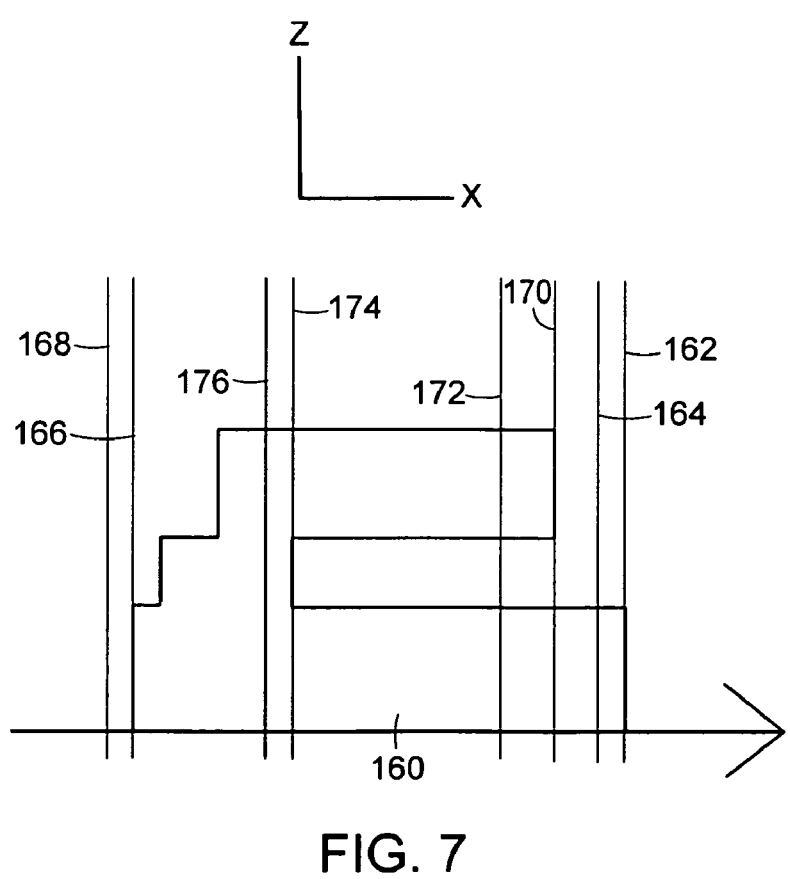

As shown in FIG. 7, a test object 160 is placed on top of the conveyor. At position 162 a valid scan or valid activity is detected by the light curtain system. At point 164 the valid activity is confirmed, i.e., detection status is one object detected. At point 166 a clear transition is detected while at point 168 a clear transition is confirmed.

At point 170 an invalid transition is detected; this scan information can saved for future use. At point 172 the invalid transition is confirmed. At point 174 a valid transition is detected and confirmed at point 176.

For illustration purposes, an object detection system with the following parameters is considered:

(a) light curtain scan rate—2 ms
(b) conveyor speed—12"inch/sec or 0.012"/ms
(c) light curtain vertical resolution—0.25"

Using the above data, a light curtain scan rate of 2 ms represents 0.024" of an object moving through the light curtain on top of the conveyor at speed of 0.012"/ms.

For illustration purposes, the following process parameters can be defined:

(a) valid confirmed—duration minimum of three consecutive valid scans, which is equivalent to "X-duration" of 6 ms and "X-profile" of 0.036 inches.

(b) invalid confirmed—duration minimum of four consecutive invalid scans, which is equivalent to "X-duration" of 8 ms and "X-profile" of 0.048 inches.

(c) valid transition confirmed—duration minimum of three consecutive valid scans, which is equivalent to "x-duration" of 6 ms and "x-profile of 0.036 in.

(d) invalid transition confirmed—duration minimum of five consecutive invalid scans, which is equivalent to "X-duration" of 10 ms and "X-profile" of 0.060 inches.

(e) Clear transition confirmed—duration minimum of six consecutive clear scans, which is equivalent to "X-duration" of 12 ms and "X-profile" of 0.072 inches.

For illustration purposes, the following process Rules are defined:

(a) valid transition connection—connection in-between adjacent scans with no gap present is considered as acceptable for valid activity.

(b) invalid transition connection—connection in-between adjacent scans with a gap or gaps present is considered as acceptable for invalid activity.

Figure 8:
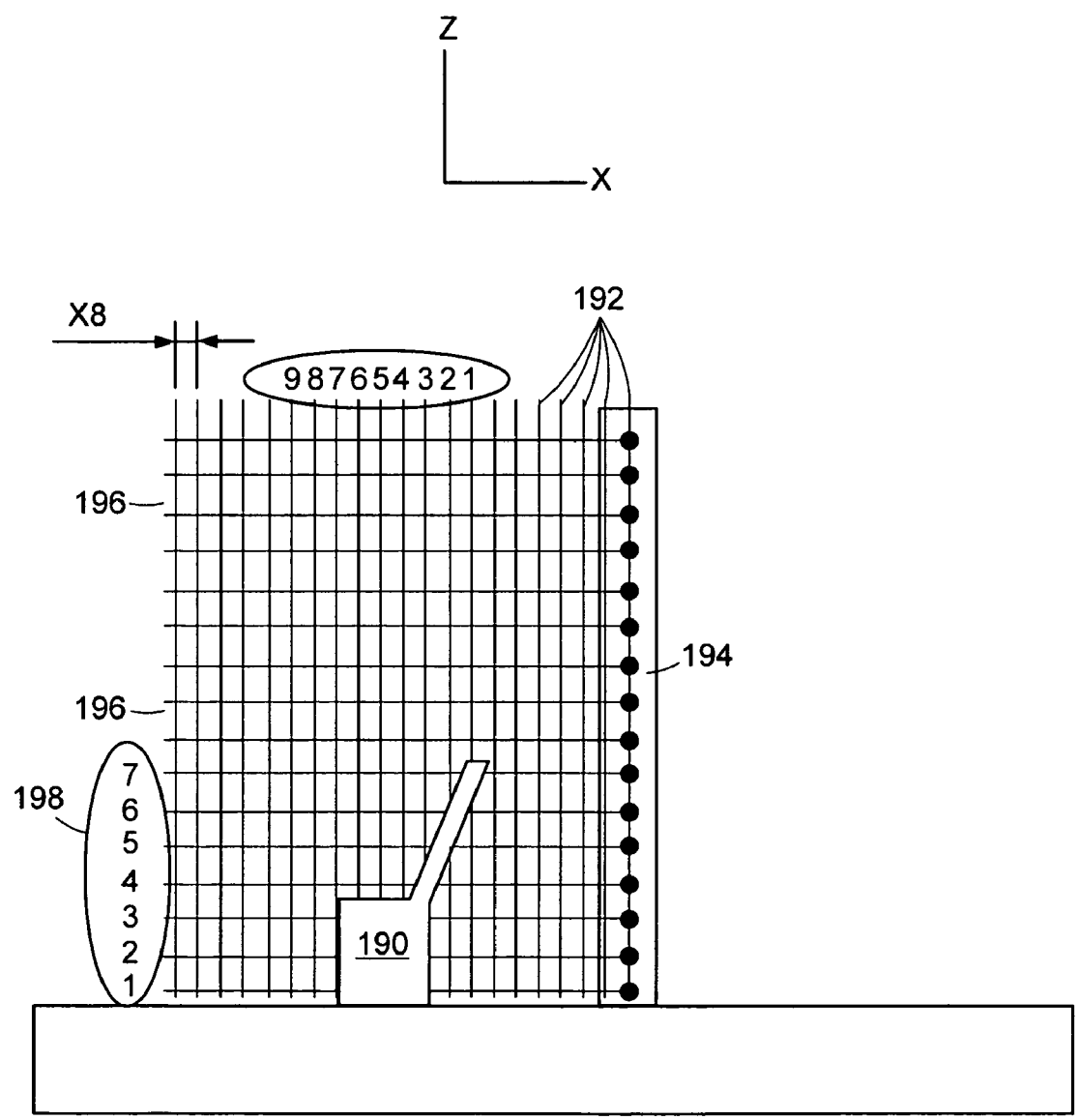

As shown in FIG. 8, motion of a test object 190 is simulated using light curtain scan reference lines 192. These scan reference lines 192 are spaced per light curtain scan Rate (×8) and are numbered in order, starting with scan #1 representing scan at which test object 190 is detected by process 1000 and ending with scan #7 as the last scan representing the presence of test object 190 within the light curtain sensing area. A sequence of numbers 198 references each beam, beginning with #1 representing the lowest beam at which test object 190 is detected by process 1000 and ending with #7 as the highest beam representing the presence of the test object 190.

Figure 9:
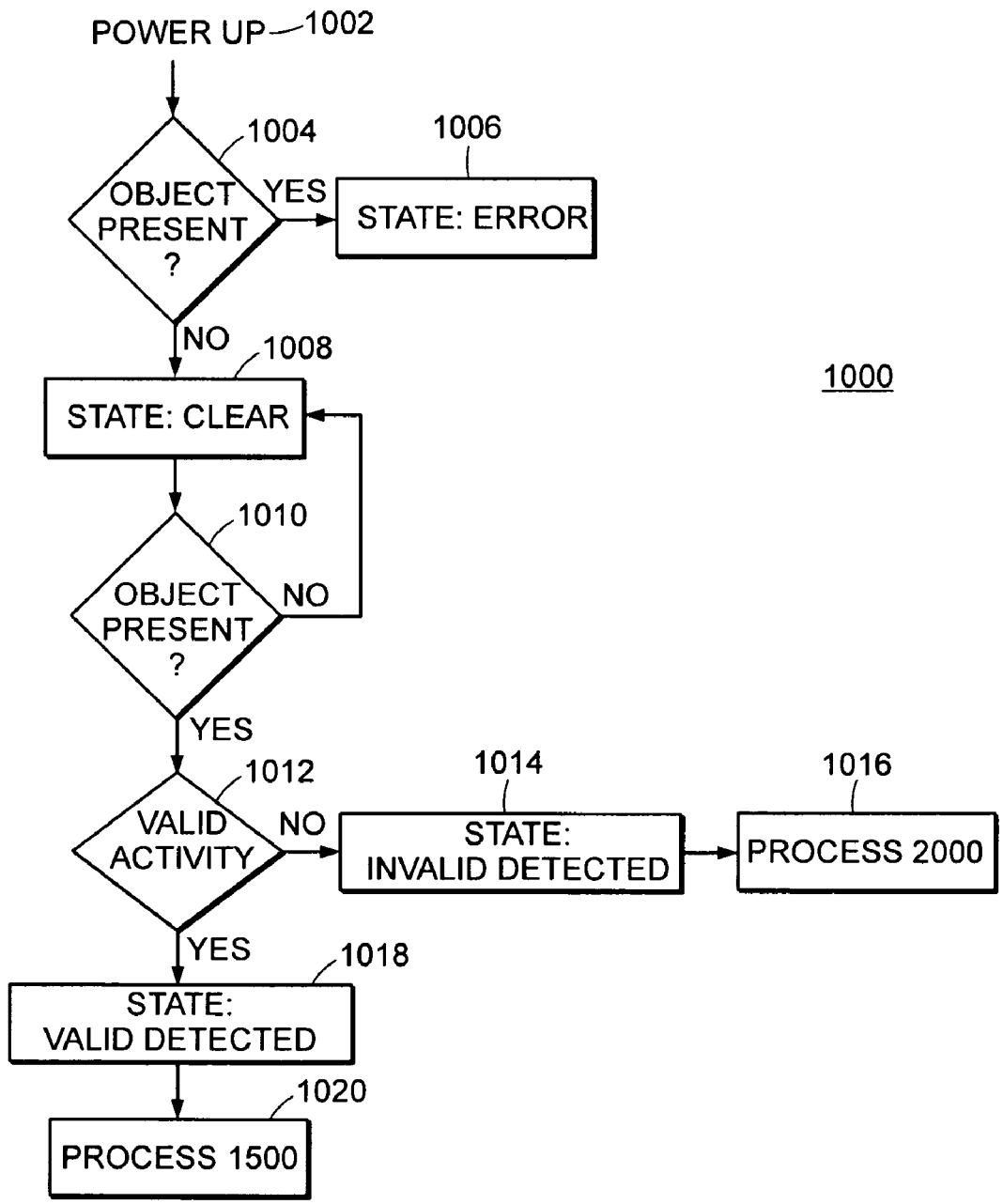
FIGS. 9-18 are flow diagrams of various processes performed by the object detection system.

As shown in FIG. 9, process 1000 includes powering (1002) the system and determining (1004) whether there is an object present. If an object is present, process 1000 sets (1006) a state to an error condition. If an object is not present, process 1000 sets (1008) the state to a clear condition and monitors (1010) whether an object is present.

If an object is present, process 1000 determines (1012) whether there is a valid activity. If no valid activity is determined (1012), process 1000 sets (1014) the state to an invalid activity detected condition and executes (1016) process 2000.

If a valid activity is determined (1012), process 1000 sets (1018) the state to a valid activity condition and executes (1020) process 1500.

Figure 10:
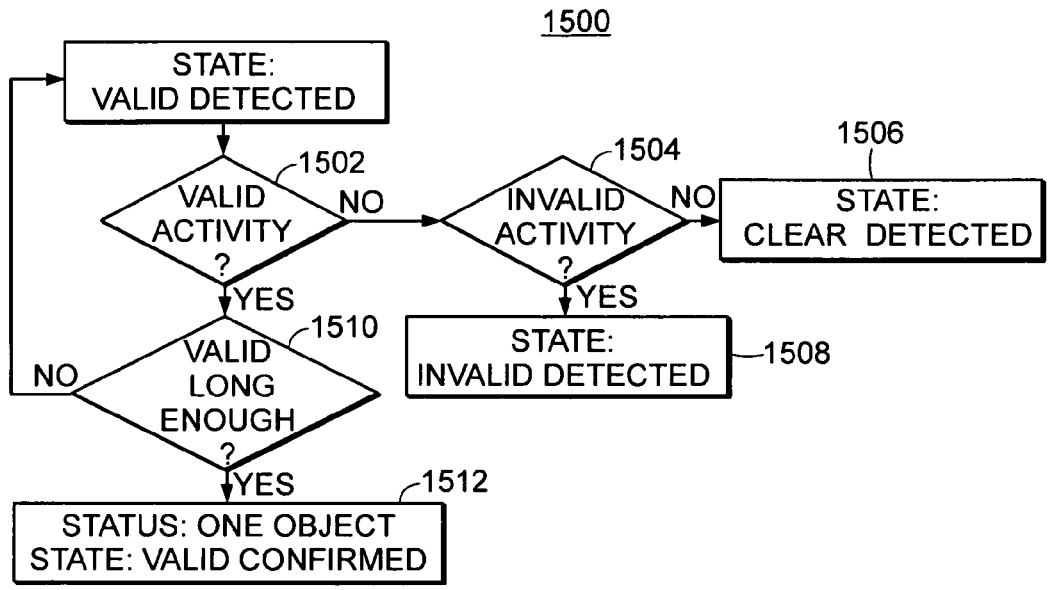

As shown in FIG. 10, process 1500 includes determining (1502) whether there is a valid activity. If it is not a valid activity, process 1500 determines (1504) whether there is an invalid activity. If process 1500 determines (1504) there is not an invalid activity, process 1500 sets (1506) the state to a clear detected condition. If there is an invalid activity, process 1500 sets (1508) the state to an invalid detected condition.

If process 1500 determines (1502) there is a valid activity, process 1500 determines (1510) whether the valid activity is valid long enough. If valid long enough, process 1500 sets (1512) a status to a one object detected condition and the state to a valid confirmed condition.

Figure 11:
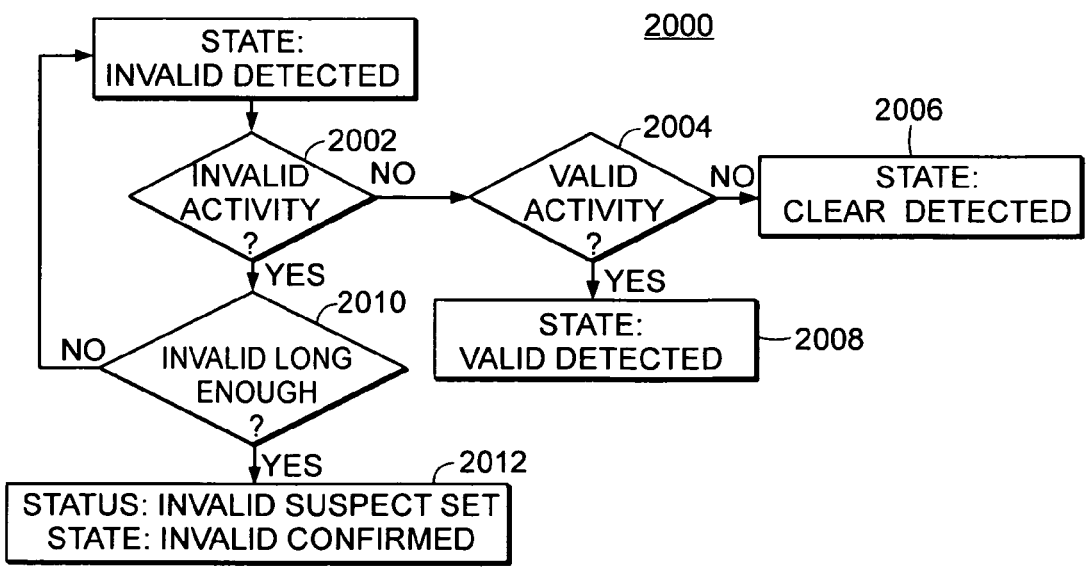

As shown in FIG. 11, process 2000 includes determining (2002) whether an invalid activity has been detected. If not, process 2000 determines (2004) whether it is a valid activity. If not, process 2000 sets (2006) a state to a clear detected condition. If invalid, then process 2000 sets (2008) the state to an invalid detected condition.

If process 2000 determines (2002) an invalid activity, process 2000 determines (2010) whether the detection has been invalid long enough. If invalid long enough, process 2000 sets (2012) sets the status to not one object and state to an invalid confirmed condition.

Figure 12:
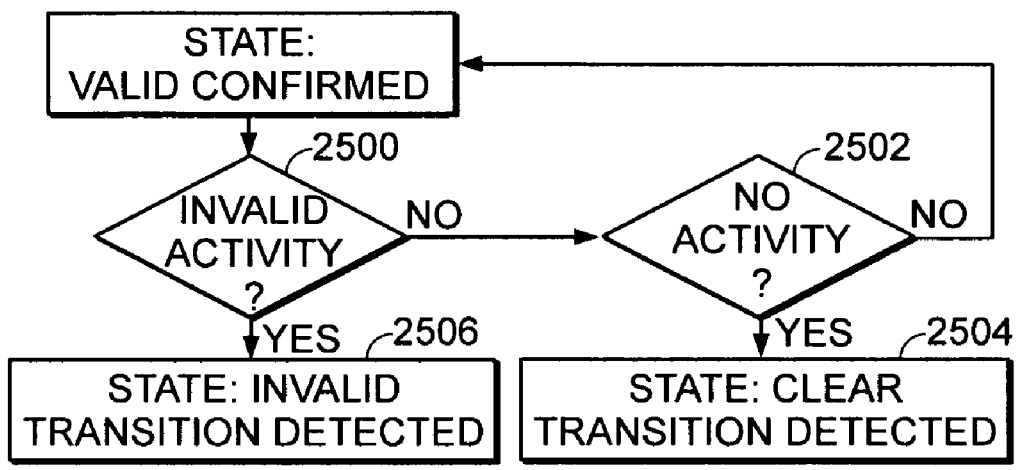

As shown in FIG. 12, when the state is in a valid confirmed condition, process 1000 determines (2500) whether there is an invalid activity. If there is no invalid activity, process 1000 determines (2502) where there is no activity. If there is no activity, process 1000 sets (2504) state to a clear transition detected condition.

If process 1000 determines (2500) there is an invalid activity, a state is set (2506) to an invalid transition detected condition.

Figure 13:
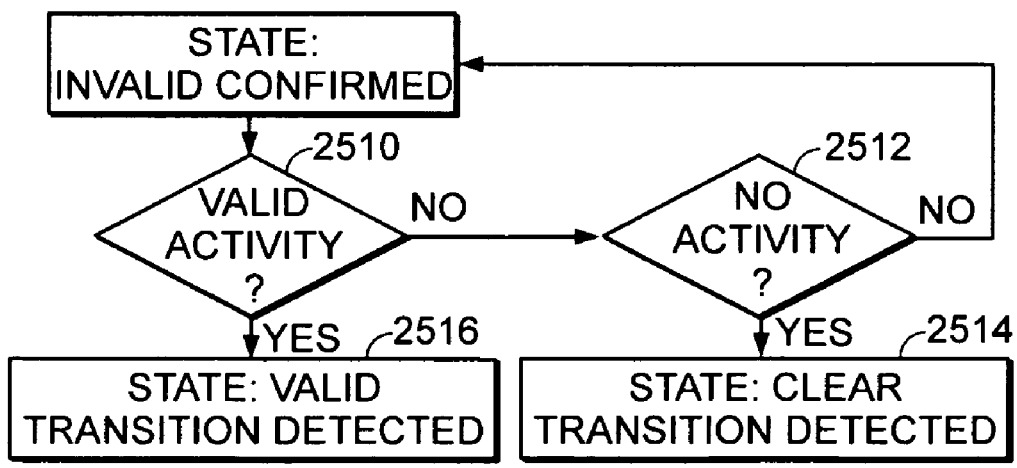

As shown in FIG. 13, when the state is in an invalid confirmed condition, process 1000 determines (2510) whether there is a valid activity. If not, process 1000 determines (2512) if there is no activity. If no activity, process 1000 sets (2514) the state to a clear transition detected condition.

If process 1000 determines (2510) that there is a valid activity, process 1000 sets (2516) the state to a valid transition detected condition.

Figure 14:
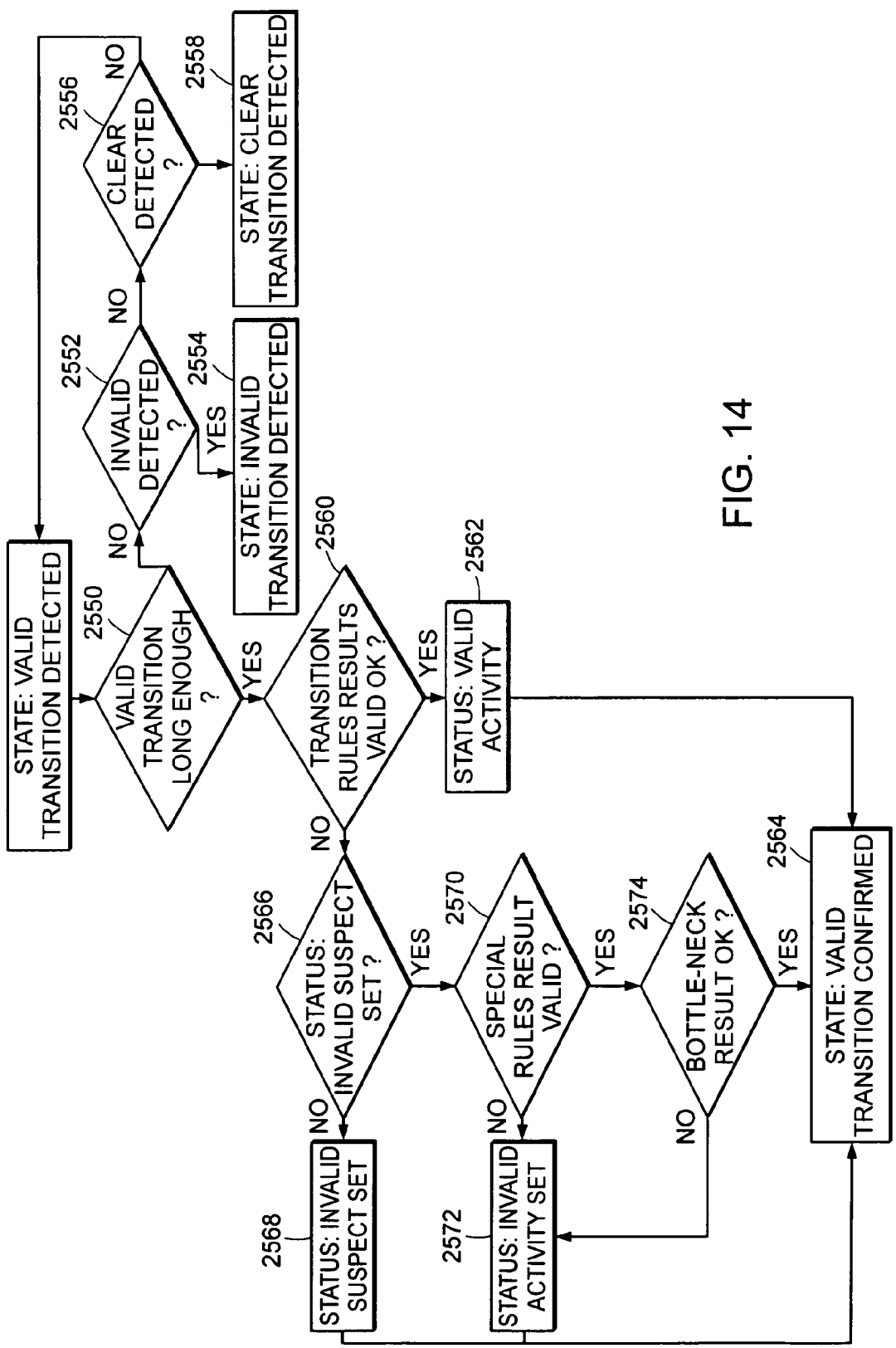

As shown in FIG. 14, when the state is in a valid transition detected condition, process 1000 determines (2550) whether the valid transition is long enough. If not long enough, process 1000 determines (2552) whether invalid is detected. If invalid detected, process 1000 sets (2554) the state to an invalid transition detected condition, otherwise, process 1000 determines (2556) whether a clear detected condition exists. If a clear transition is detected, process 1000 sets (2558) the state to a clear transition detected state.

If process 1000 determines (2550) the valid transition was long enough, process 1000 determines (2560) the transition rules results were acceptable. If acceptable, process 1000 sets (2562) the status as a valid activity and the state (2564) as a valid transition confirmed.

If the transition rules results were not acceptable, process 1000 determines (2566) if the status is set to invalid suspect. If not invalid suspect, process 1000 sets the status to invalid suspect and the state (2564) to a valid transition confirmed condition.

If the invalid suspect status is set, process 1000 determines (2570) whether special rules results are valid. If not valid, process 1000 sets (2572) the status to invalid activity and the state (2564) to a valid transition confirmed condition.

If the special rules results are valid, process 1000 determines (2574) whether the bottleneck result (e.g., an example special rule) is acceptable. If not acceptable, process 1000 sets (2572) the status as invalid activity and the state (2564) to a valid transition confirmed condition.

Figure 15:
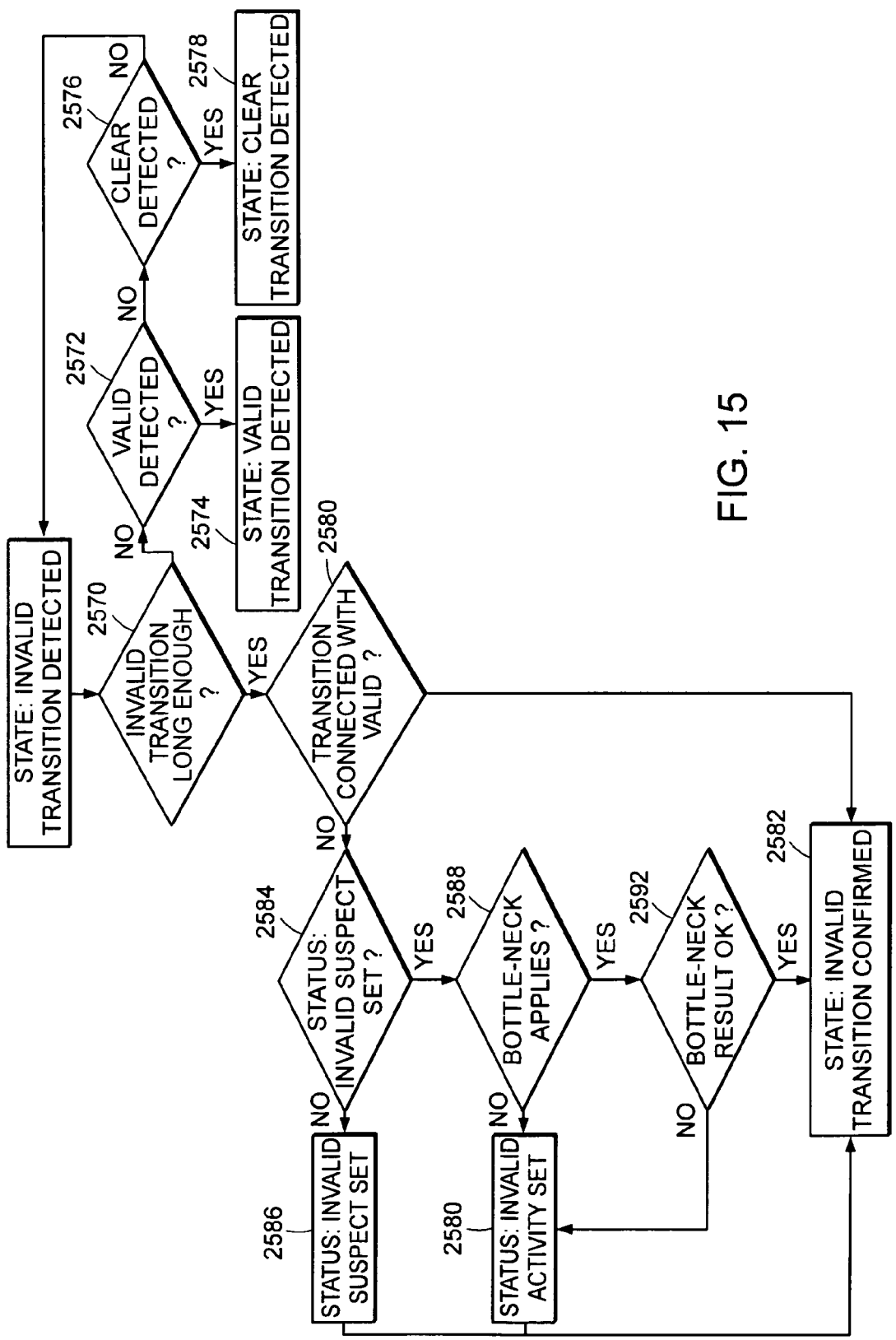

As shown in FIG. 15, if the state is in an invalid transition detected condition, process 1000 determines (2570) whether an invalid transition was long enough. If not long enough, process 1000 determines (2572) whether there was valid detected. If valid detected, process 1000 sets (2574) the state as valid transition detected. If not valid detected, process 1000 determines (2576) whether there is a clear detected. If clear detected, process 1000 sets (2578) the state to a clear transition detected condition.

In the invalid transition was long enough, process 1000 determines (2580) whether the transition was connected with a valid. If connected with valid, process 1000 sets (2582) the state to an invalid transition confirmed condition.

If the transition was not connected to valid, process 1000 determines (2584) the status is set to invalid suspect. If not, process 1000 sets (2586) the status to invalid suspect and the state (2582) to invalid transition confirmed. If set to invalid suspect, process 1000 determines (2588) whether a bottleneck rule applies. If a bottleneck applies, process 1000 sets (2590) to invalid activity and the state (2582) to invalid transition confirmed.

If bottleneck applies, process 1000 determines (2592) whether the bottleneck result is acceptable. If not acceptable, process 1000 sets (2590) the status to invalid activity set and the state (2582) to invalid transition confirmed. If the bottleneck result is acceptable, process 1000 sets (2582) to invalid transition confirmed.

Figure 16:
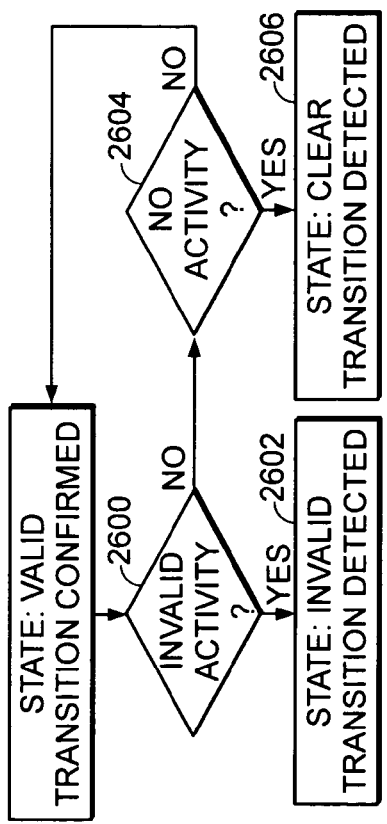

As shown in FIG. 16, when in a state set to a valid transition confirmed condition, process 1000 determines (2600) whether there is an invalid activity. If an invalid activity, process 1000 sets (2602) the state to an invalid transition detected condition. If there is no invalid activity, process 1000 determines (2604) if there is no activity. If there is no activity, process 1000 sets (2606) the state to a clear transition detected condition.

Figure 17:
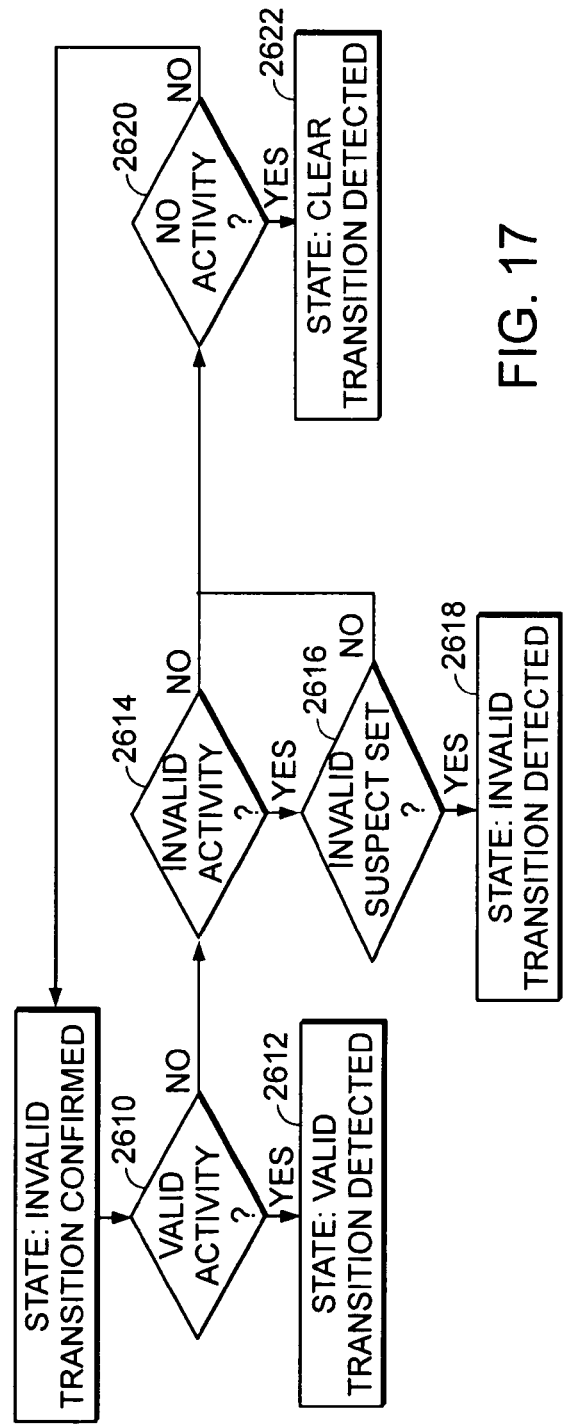

As shown in FIG. 17, when the state is in an invalid transition confirmed condition, process 1000 determines (2610) whether there is a valid activity. If there is a valid activity, process 1000 sets (2612) the state to a valid transition detected condition.

If there is no valid activity, process 1000 determines (2614) if there is invalid activity. If invalid activity, process 1000 determines (2616) whether invalid suspect is set. If set, process 1000 sets (2618) the state to an invalid transition detected condition. If not an invalid activity or the invalid suspect is not set, process 1000 determines (2620) whether there is no activity. If there is no activity, process 1000 sets (2622) the state to a clear transition detected condition.

Figure 18:
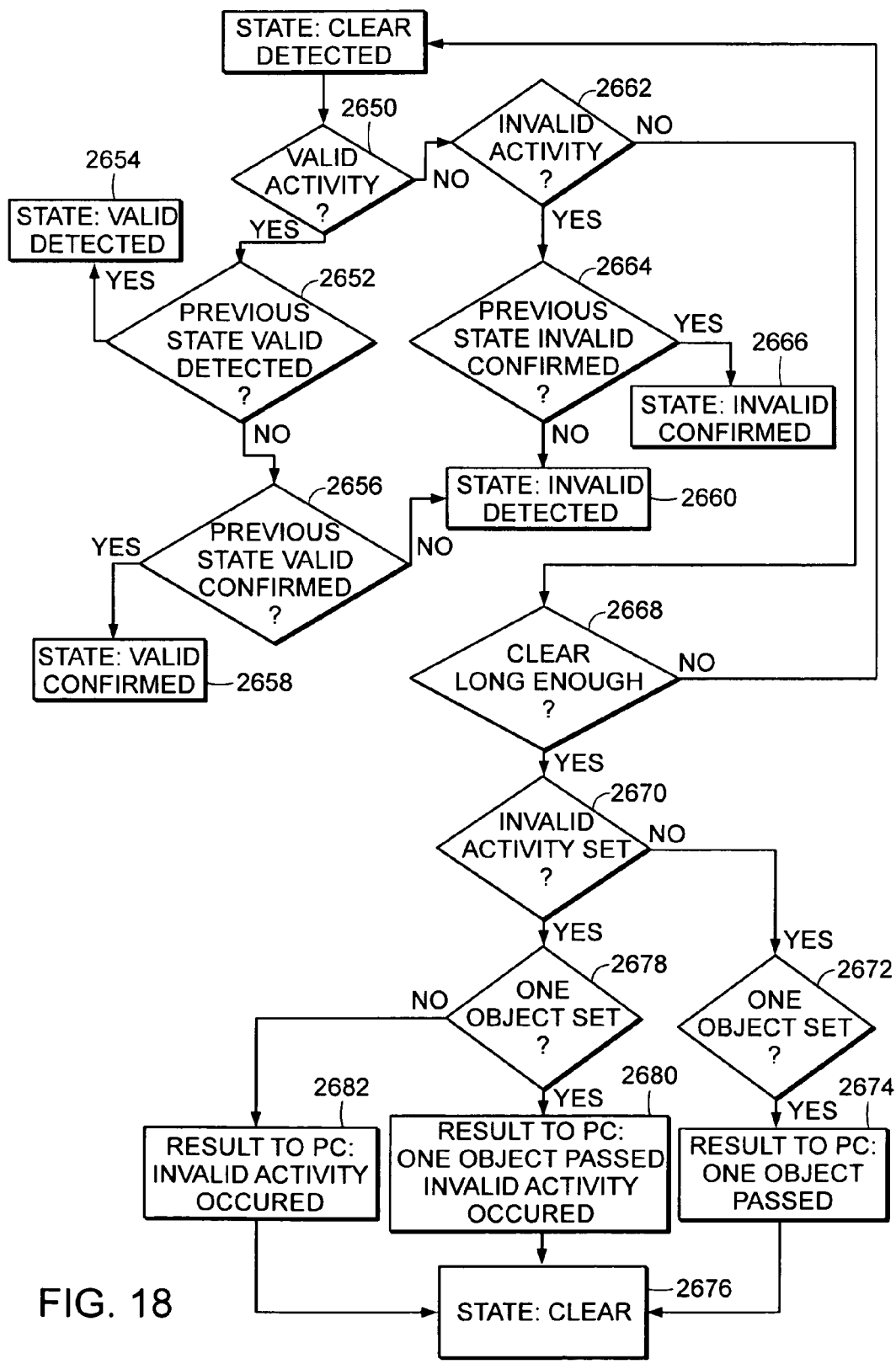

As shown in FIG. 18, if the state is in a clear detected condition, process 1000 determines (2650) whether there is valid activity. If valid activity, process 1000 determines (2652) whether a previous state was valid detected. If a previous state was valid detected, process 1000 sets (2654) the state to a valid detected condition. If a previous state was not valid detected, process 1000 determines (2656) whether the previous state was valid confirmed. If valid confirmed, process 1000 sets (2658) the state to a valid confirmed condition. If not valid confirmed, process 1000 sets (2660) the state to an invalid detected condition.

If not a valid activity, process 1000 determines (2662) whether there is an invalid activity. If invalid, process 1000 determines (2664) whether a previous state was invalid confirmed. If invalid confirmed, process 1000 sets (2660) the state to invalid detected. If not invalid confirmed, process 1000 sets (2666) the state to an invalid confirmed condition.

If there is not an invalid activity, process 1000 determines (2668) whether there was clear long enough. If clear long enough, process 1000 determines (2670) whether invalid activity is set. If not set, process 1000 sends the results to the PC (as one object passed), and sets (2676) the state to a clear condition.

If set, process 1000 determines (2678) whether one object is set. If set, process 1000 sends (2680) the results to the PC (as one object passed and an invalid activity occurred) and sets (2676) the state to a clear condition.

If not set, process 1000 sends (2682) the results to the PC (as invalid activity occurred) and sets (2672) the state to a clear condition.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the inven-

What is claimed is:

1. A computer-implemented method comprising:
defining a valid scan or range of valid scans as a valid activity of an object in an application-specific activity taking place through a light curtain sensing area of a light curtain;
defining an invalid scan or range of invalid scans as an invalid activity of the object in the application-specific activity taking place through the light curtain sensing area of the light curtain;
storing parameters and activity-specific rules for processing a plurality of objects;
monitoring and processing the object in the application-specific activity taking place through a light curtain sensing area of a light curtain in conjunction with the stored parameters and activity-specific rules; and
reporting a status and results of the processing of the object.

2. The computer-implemented method of claim 1 further comprising executing application-specific control actions to warn a host computer system of a detected violation or violations.

3. The computer-implemented method of claim 1 wherein reporting comprises audible indicators.

4. The computer-implemented method of claim 1 wherein reporting comprises visual indicators.

5. The computer-implemented method of claim 1 wherein monitoring and processing comprises receiving real-time modifications to the stored parameters and activity-specific rules from a remote computer system over a communications link.

6. The computer-implemented method of claim 5 wherein the real-time modifications to the stored parameters tune object detection intensity.

7. The computer-implemented method of claim 5 wherein the real-time modifications to the stored parameters tune violation detection intensity.

8. The computer-implemented method of claim 5 wherein the real-time modifications to the stored parameters tune status reporting intensity related to real-time object detection.

9. The computer-implemented method of claim 5 wherein the stored parameters and activity-specific rules are adjustable in response to environmental changes detected by the remote computer system.

10. The computer-implemented method of claim 1 wherein the stored parameters and activity-specific rules are adjustable when respective objects appear within the light curtain sensing area.

11. A computer-implemented method comprising:
recording actual object scan data of objects in an object library;
editing the recorded object scan data;
storing the recorded and/or edited object scan data in a computer connected to a controller of a light curtain;
downloading the objection scan data;
simulating an object moving through a light curtain sensing area of the light curtain to generate and store parameters and activity-specific rules for processing a specific object;
monitoring and processing the specific object in an application-specific activity taking place through a light curtain sensing area of a light curtain in conjunction with the stored parameters and activity-specific rules; and
reporting a status and results of the processing of the specific object.

12. The computer-implemented method of claim 11 further comprising executing application-specific control actions to warn a host computer system of a detected violation or violations.

13. The computer-implemented method of claim 11 wherein reporting comprises audible indicators.

14. The computer-implemented method of claim 11 wherein reporting comprises visual indicators.

15. The computer-implemented method of claim 11 wherein monitoring and processing comprises receiving real-time modifications to the stored parameters and activity-specific rules from a remote computer system over a communications link.

16. The computer-implemented method of claim 15 wherein the real-time modifications to the stored parameters tune object detection intensity.

17. The computer-implemented method of claim 15 wherein the real-time modifications to the stored parameters tune violation detection intensity.

18. The computer-implemented method of claim 15 wherein the real-time modifications to the stored parameters tune status reporting intensity related to real-time object detection.

19. The computer-implemented method of claim 15 wherein the stored parameters and activity-specific rules are adjustable in response to environmental changes detected by the remote computer system.

20. The computer-implemented method of claim 11 wherein the stored parameters and activity-specific rules are adjustable when respective objects appear within the light curtain sensing area.

* * * * *